US007016292B1

(12) United States Patent
Hayes et al.

(10) Patent No.: US 7,016,292 B1
(45) Date of Patent: Mar. 21, 2006

(54) GEOMETRY FOR OPTICAL DATA STORAGE

(75) Inventors: David A. Hayes, Huntsville, AL (US); J. Russell Alexander, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 321 days.

(21) Appl. No.: 10/400,085

(22) Filed: Mar. 21, 2003

(51) Int. Cl.
*G11B 7/00* (2006.01)
(52) U.S. Cl. ............... 369/126; 369/112.24; 369/100
(58) Field of Classification Search ............... 369/126, 369/100, 44.28, 44.37, 44.15, 101, 44.12, 369/275.3, 275.2, 275.4, 112.24
See application file for complete search history.

(56) References Cited

U.S. PATENT DOCUMENTS

| 4,310,916 A | * | 1/1982 | Dil | 369/109.02 |
| 4,674,070 A | * | 6/1987 | Tajima et al. | 369/44.37 |
| 5,894,465 A | * | 4/1999 | Ja | 369/103 |
| 6,111,827 A | * | 8/2000 | Miike | 369/44.14 |

OTHER PUBLICATIONS

Professor Kelin J. Kuhn, "Audio Compact Disk—An Introduction" EE 498, http://www.ee.washington.edu/conselec/CE/kuhn/cdaudio/95x6.htm, May 16, 2003.

* cited by examiner

*Primary Examiner*—Nabil Hindi
(74) *Attorney, Agent, or Firm*—USA Space and Missle Defense Command

(57) ABSTRACT

An optical data storage device includes an optically readable disk that has a body extending in a radial direction from a central axis. The body has a side and an elongated portion that extends along the side. The elongated portion includes a first side surface and a second side surface. A plurality of optically readable discontinuities may be located on each of the first side surface and the second side surface of the elongated portion.

13 Claims, 4 Drawing Sheets

GEOMETRY FOR OPTICAL DATA STORAGE

BACKGROUND OF THE INVENTION

1. Field of the Invention

The present invention relates to devices for optical storage and retrieval of information and, more particularly, to optical disks which provide greater density for storage and retrieval of information, to correspondingly configured optical readers and to optical readers configured to increase the reliability and rate of transfer of information to be stored or retrieved.

2. Related Art

Storing data on media that is optically read and/or written to is known. As illustrated in FIG. 1, a typical optical disk 10 comprises a radially extending body or substrate 12 having discontinuities such as lands 14 located on a side 16 thereof. The lands 14 are arranged together to form a track 18 which includes windings 20 which spiral about the side 16 of the substrate 12. The lands 14 have outer edges 22 which may each be read by an optical head (not shown) as an instruction, e.g., to go high.

Each winding 20 of the track 18 may be separated by a distance (D) of 740 nanometers and each land may dimension 400 nanometers in length (L) by 320 nanometers in width (W). A thickness (T) of the land may be approximately 120 nanometers.

Accordingly, the amount of data which may be stored on an optical disk 10 is limited by the radial dimension of the disk. With increasing demands for data storage capability, a need exists for increasing the storage capacity of the optical disk.

SUMMARY OF THE INVENTION

In accordance with an embodiment of one aspect of the present invention, an optical data storage device comprises an optically readable disk that comprises a body extending in a radial direction from a central axis. The body has a side and an elongated portion that extends along the side. The elongated portion comprises a first side surface and a second side surface. A plurality of optically readable discontinuities are located on each of the first side surface and the second side surface of the elongated portion.

Another aspect of the present invention involves a head for reading or writing to an optical disk. The head comprises a housing and a first lens mounted to the housing whereby a first optical beam may be output that is directed in a first linear direction. A second lens may be mounted to the housing whereby a second optical beam may be output that is directed in a second linear direction. The first linear direction and the second linear direction form an angle that is in the range of from about 90° to about 120°.

A further aspect of the present invention involves a head for reading or writing to an optical disk having a track, the track spiraling about a side of the optical disk and thereby forming multiple windings and having a plurality of optically readable discontinuities. The head comprises a housing and a first read/write sensor/laser that is mounted to the housing and is configured to read or write to a first winding on the optical disk. A second read/write sensor/laser also may be mounted to the housing and is configured to read or write to a second winding on the optical disk.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE PREFERRED EMBODIMENT

One aspect of the present invention concerns a device for increasing the quantity of data which may be stored on an optical disk. The disk may include a track which comprises spiral windings of an elongated portion disposed along one side of an optical disk. The elongated portion comprises two side surfaces whereon discontinuities, such as lands, may be located. By such a structure, a 40% increase in the quantity of data that may be stored on an optical disk is achievable.

Figure 2:
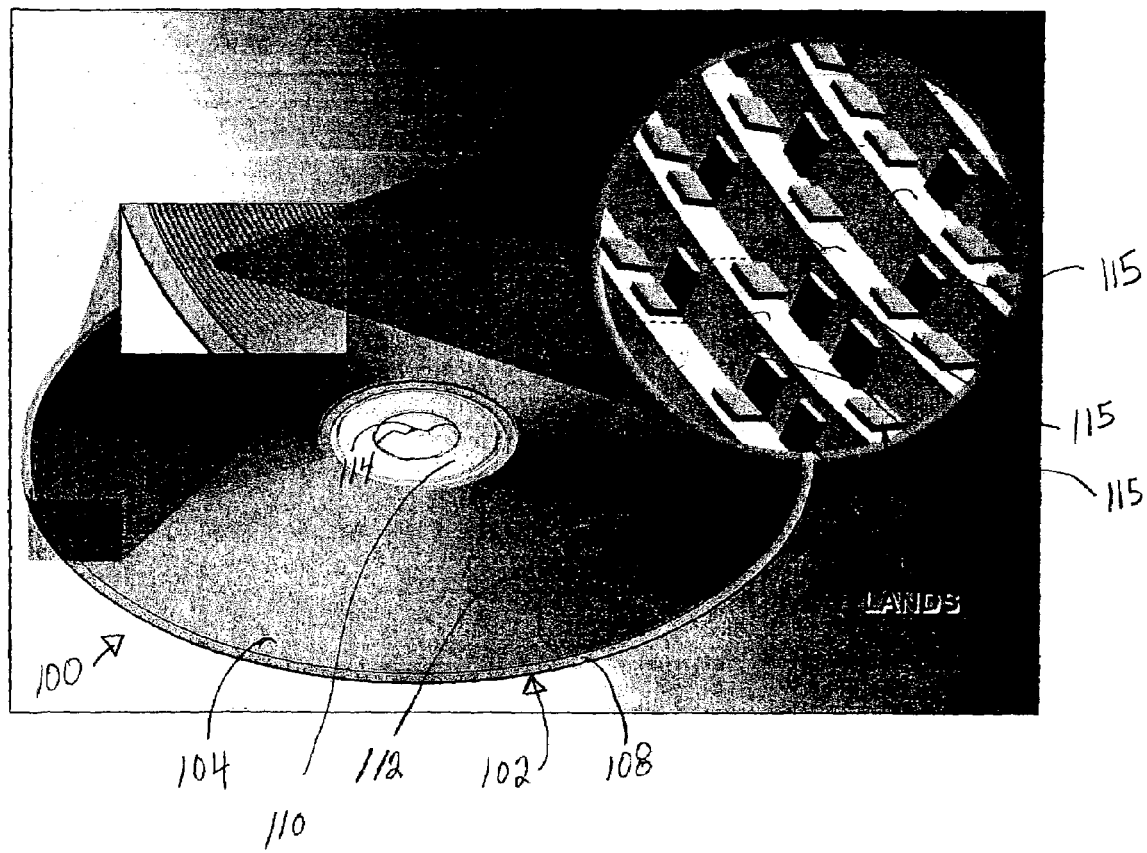
FIG. 2 is a perspective view of an optical disk in accordance with an embodiment of the present invention.
Figures 3, 4:
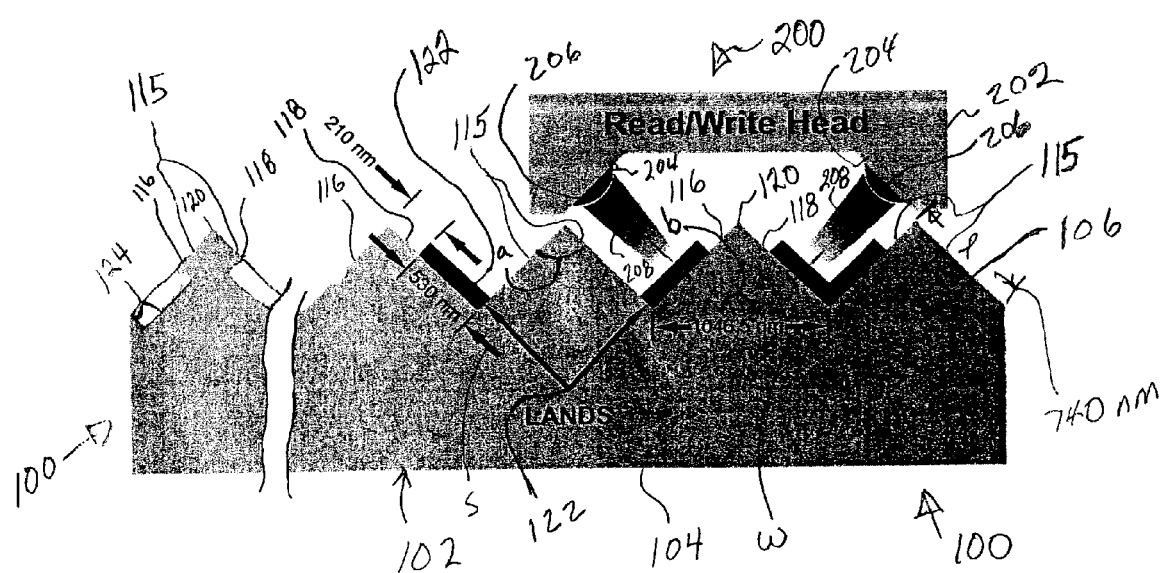
FIG. 3 is a cross sectional view of a portion of the optical disk of FIG. 2 including a read/write head configured in accordance with another aspect of the present invention.
FIG. 4 is a cross sectional view of a portion of an optical disk including pits in accordance with another embodiment of the present invention.

Referring now to FIGS. 2 and 3, an optical disk in accordance with one embodiment of this aspect of the present invention is illustrated generally at 100. In this embodiment, the optical disk 100 may comprise a body or substrate 102 that may comprise a transparent plastic material, such as polycarbonate. The substrate 102 may include a first side 104 and a second side 106. The first side 104 may be generally planar, a portion of which is best seen in FIG. 3, whereon a label or other indicia may be located in a known manner. The second side 106 may include an edge portion 108, a mounting portion 110 and a track portion 112. The edge portion 108 may be generally flat and may function, e.g., as a spacer for the track portion 112. The mounting portion 110 includes an aperture 114 for properly locating the disk in a known manner on a drive system (not shown).

In accordance with a feature of this aspect of the present invention, the track portion 112 comprises an elongated portion 115 which may extend in a spiral manner about the second side 106 and may comprise a first side surface 116 and a second side surface 118. The first side surface 116 and second side surface 118 may intersect at an edge 120 (or point in cross section as shown in FIG. 3) to form an angle (a) which may range from about 60° to about 90°. Preferably, the angle (a) is approximately 90°. As illustrated, an angle (a) gives the elongated portion 115 a generally triangular or saw tooth-like configuration in cross section. It will be appreciated that by providing elongated portion 115 with a plurality of surfaces, the surface area of the second side 106, whereupon discontinuities such as lands or pits may be provided, representing data, is increased substantially. The illustrated saw tooth-like configuration may increase surface area by up to 40%.

Located on the first side surface 116 and the second side surface 118 are discontinuities, such as lands 122 which provide in a known manner a variation in refractive index and thereby may represent data. Referring now to FIG. 4, it will be understood that pits 124, rather than lands 122, may be employed. It will also be contemplated that rather than either lands or pits, a coating of a known photosensitive compound may be employed for representing data. The coating may be varied in a known manner by a laser during a writing process.

Referring again to FIG. 3 and in one preferred embodiment, the dimensional parameters of the elongated portion 115 may include a width (w) of 1046.5 nanometers (nm) and a length (l) of 740 nm. The lands 122 may be generally square in outer configuration and may be dimensioned to 530 nm along a side (s).

In accordance with another aspect of the present invention, one embodiment of a head that may be employed to read data from or write data to the optical disk 100, described above, is shown generally at 200 in FIG. 3. The head 200 comprises a housing 202 which may be composed of any suitably strong and durable material such as a moldable plastic including, e.g., polycarbonate. The housing 202 may be configured to include angled socket portions 204 wherein a pair of lenses 206 may be mounted. As illustrated, electromagnetic beams 208 may emanate from the head 200 to read, or write to, the disk 100. In correspondence with the angle (a) at the intersection of surfaces 116 and 118, the beams 208 may intersect to form an angle (b) that is in the range of from about 90° to about 120°. Preferably angle (b) is about 90°.

Figure 1:
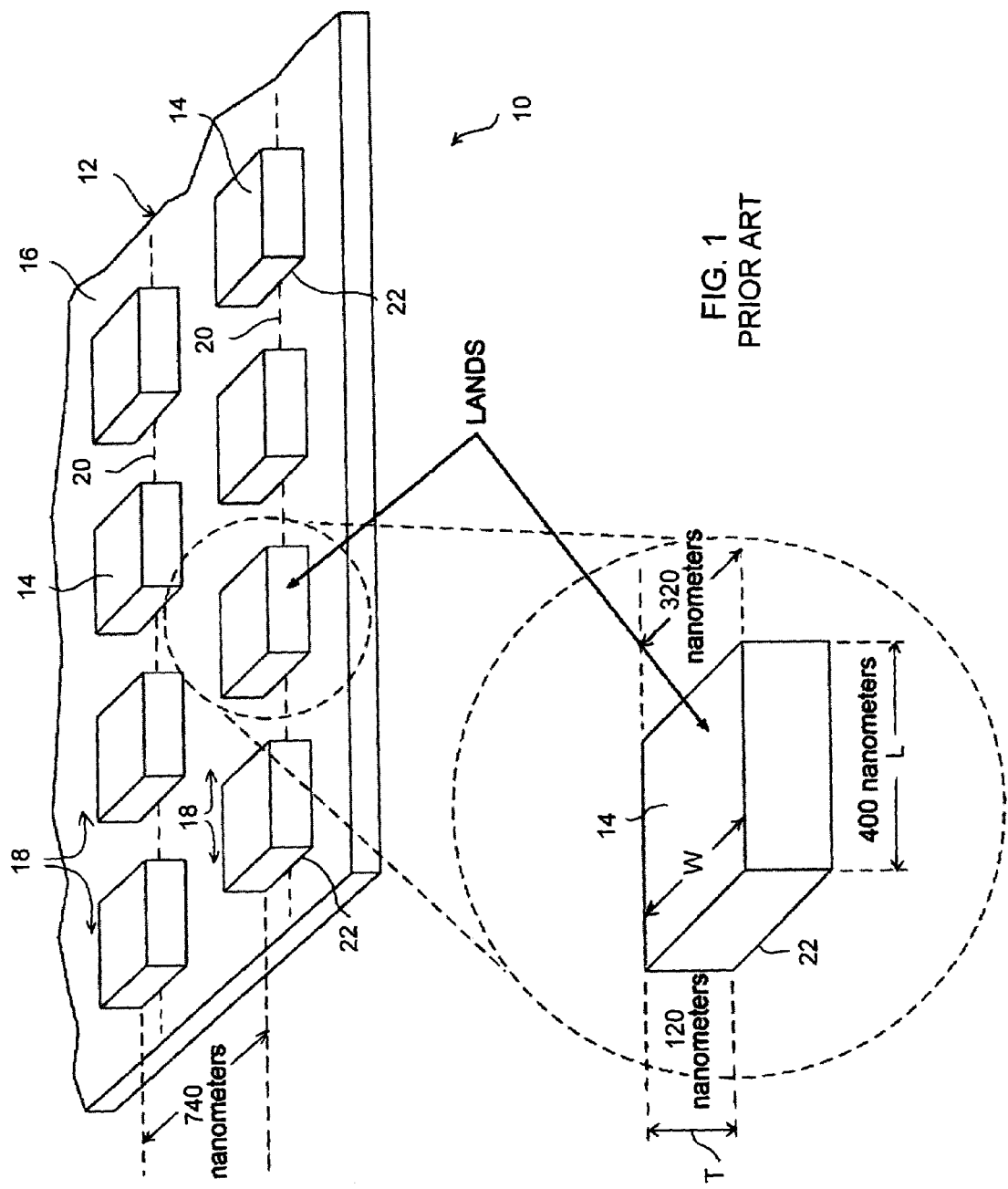
FIG. 1 is a perspective view of a portion of an optical disk in accordance with the prior art.
Figures 5, 5A, 5B:
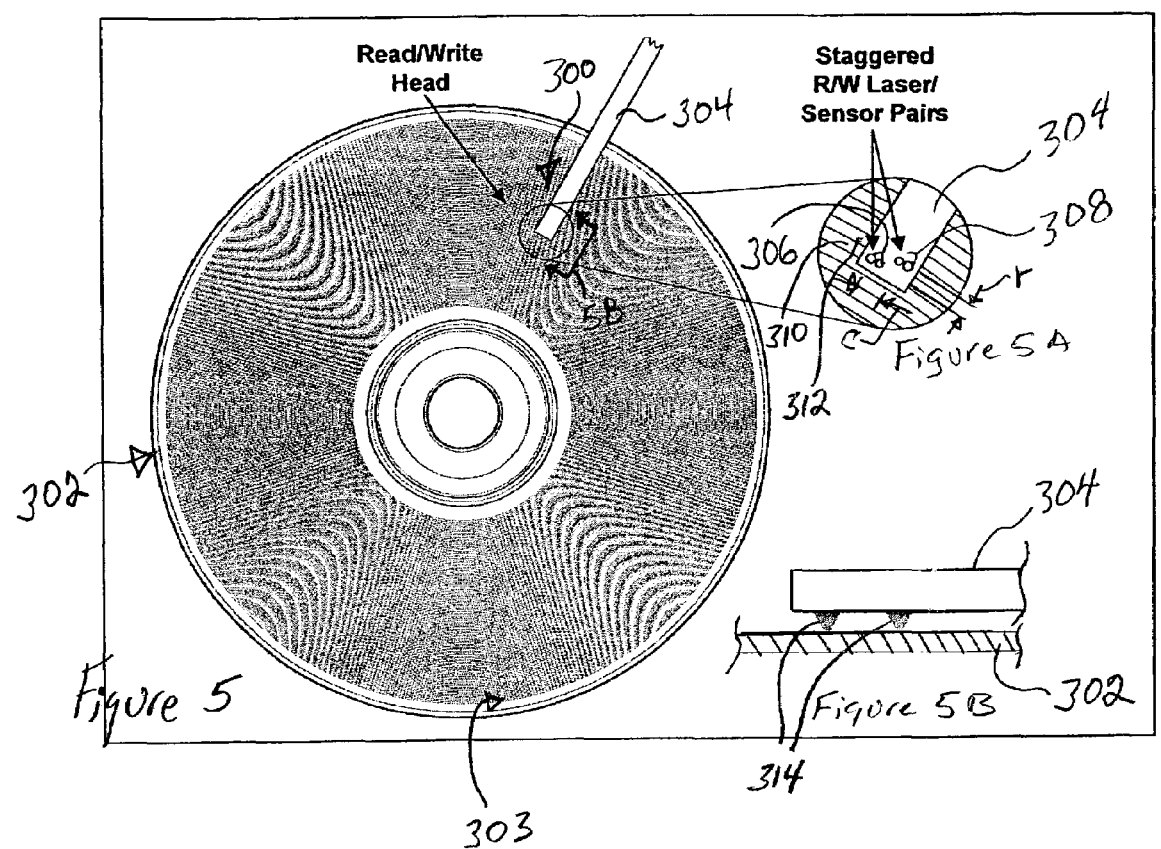
FIG. 5 is a diagrammatical view of an optical disk and a read/write head including staggered read/write laser pairs in accordance with another aspect of the present invention.
FIG. 5A is an enlarged portion of FIG. 5.
FIG. 5B is a section taken along line 5B of FIG. 5.

Referring now to FIGS. 5–5B, another embodiment of a head is shown generally at 300. The head 300 is configured to read a conventional optical disk 302 which may be similar to the optical disk 10 shown in FIG. 1 and thus reference may be had to FIG. 1 and the description above for details of the optical disk 302. The optical disk 302 includes a track 303 including a plurality of optically readable discontinuities (not shown).

The head 300 may comprise a housing 304 and read/write sensor/laser pairs 306 and 308. The housing 304 may be composed of any suitably strong and durable material such as that described above in connection with the housing 202. The read/write sensor/laser pairs 306 and 308 may be located relative to each other such that they are spaced in the radial direction (r) and in the circumferential direction (c). The radial spacing allows the read/write sensor laser pair 306 to read a winding 310 of the track 303 while contemporaneously the read/write sensor/laser pair 308 may read an adjacent winding 312. The spacing in the circumferential direction (c) is advantageous as it provides physical room for the read/write heads mounted on the housing 304. As illustrated, electromagnetic beams 314 may emanate from the head 300 to read, or write to, the disk 302.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. An optical data storage device, comprising:
   an optically readable disk comprising a body extending in a radial direction from a central axis, the body having a side;
   an elongated portion having a triangular shape and extending along the side of the body, the elongated portion forming a plurality of spiral windings in cross section, each one of the windings in cross section comprising a first side surface and an adjacent second side surface; and
   a plurality of optically readable discontinuities located, in cross section, on both the first side surface and the second side surface of the windings,
   wherein the first side surface and the second side surface together define an angle, in cross section, which is in the range of from about 60° to about 90°.

2. The device of claim 1, wherein, in cross section, the first side surface and the second side surface terminate at a point.

3. The device of claim 2, wherein the first side surface and the second side surface of each of the windings, together, define a generally saw-tooth like shape in cross section.

4. An optical data storage device, comprising:
   an optically readable disk comprising a body extending in a radial direction from a central axis, the body having a side;
   an elongated portion having a triangular shape and extending along the side of the body, the elongated portion forming a plurality of spiral windings in cross section, each one of the windings in cross section comprising a first side surface and an adjacent second side surface; and
   a plurality of optically readable discontinuities located, in cross section, on both the first side surface and the second side surface of the windings,
   wherein, in cross section, the first side surface and the second side surface terminate at a point, and
   wherein the first side surface and the second side surface together define an angle, in cross section, which is in the range of from about 60° to about 90°.

5. The device of claim 4, wherein the angle is about 90°.

6. The device of claim 1, wherein the discontinuities comprise lands.

7. The device of claim 1, wherein the discontinuities comprise pits.

8. The device of claim 1, wherein the discontinuities comprise a coating of a photosensitive compound.

9. An optical data storage device, comprising:
   an optically readable disk comprising a body extending in a radial direction from a central axis, the body having a side;
   an elongated portion extending along the side of the body, the elongated portion comprising a first side surface and a second side surface;
   a plurality of optically readable discontinuities located on each of the first side surface and the second side surface of the elongated portion; and
   a head for reading or writing to the disk, the head comprising:
      a housing,
      a first lens mounted to the housing through which a first optical beam is output that is directed in a first linear direction, and
      a second lens mounted to the housing through which a second optical beam is output that is directed in a second linear direction,
      wherein the first optical beam and the second optical beam intersect and the first linear direction and the second linear direction form an angle that is in the range of from about 90° to about 120°.

10. A head for reading or writing to an optical disk, comprising:
- a housing;
- a first lens mounted to the housing whereby a first optical beam is output that is directed in a first linear direction; and
- a second lens mounted to the housing whereby a second optical beam is output that is directed in a second linear direction;
- wherein the first linear direction and the second linear direction form an angle that is in the range of from about 90° to about 120°.

11. The device of claim 10 wherein the first linear direction and the second linear direction intersect and wherein the angle is approximately 90°.

12. A head for reading or writing to the device of claim 1, the head comprising:
- a housing;
- a first read/rite sensor/laser mounted to the housing and being configured to read or write to a first winding on the optical disk; and
- a second read/write sensor/laser mounted to the housing and being configured to read or write to a second winding on the optical disk.

13. An optical data storage device, comprising:
- an optically readable disk comprising a body extending in a radial direction from a central axis, the body having a side;
- an elongated portion having a triangular shape and extending along the side of the body the elongated portion forming a plurality of spiral windings in cross section, each one of the windings in cross section comprising a first side surface and an adjacent second side surface;
- a plurality of optically readable discontinuities located, in cross section, on both the first side surface and the second side surface of the windings; and
- a head for reading or writing to the optical data storage device, the head comprising,
   - a housing,
   - a first read/write sensor/laser mounted to the housing and being configured to read or write to a first winding on the optical disk, and
   - a second read/write sensor/laser mounted to the housing and being configured to read or write to a second winding on the optical disk,
- wherein the first read/write sensor/laser is both radially and circumferentially spaced from the second read/write sensor/laser.

* * * * *